(12) United States Patent
Namuduri et al.

(10) Patent No.: US 10,436,167 B1
(45) Date of Patent: Oct. 8, 2019

(54) STARTER SYSTEM AND METHOD OF CONTROL

(71) Applicant: GM Global Technology Operations LLC, Detroit, MI (US)

(72) Inventors: Chandra S. Namuduri, Troy, MI (US); Venkata Prasad Atluri, Novi, MI (US); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/961,198

(22) Filed: Apr. 24, 2018

(51) Int. Cl.
F02N 11/08 (2006.01)

(52) U.S. Cl.
CPC ...... *F02N 11/0866* (2013.01); *F02N 11/0818* (2013.01); *F02N 11/0851* (2013.01); *F02N 11/0859* (2013.01); *F02N 2011/0885* (2013.01); *F02N 2011/0888* (2013.01); *F02N 2011/0896* (2013.01); *F02N 2200/023* (2013.01); *F02N 2200/063* (2013.01)

(58) Field of Classification Search
USPC .................. 290/36 R, 38 R; 180/65.2–65.29; 307/9.1; 310/156–156.99; 701/22
See application file for complete search history.

(56) References Cited

U.S. PATENT DOCUMENTS 5,151,017 A 9/1992 Sears et al.
6,034,459 A 3/2000 Matsunobu et al.
7,116,065 B2 10/2006 Wakitani et al.
7,657,350 B2 * 2/2010 Moran ............... B60K 6/12
701/22

(Continued)

FOREIGN PATENT DOCUMENTS

CN 2711983 Y 7/2005
CN 101487434 A 7/2009

(Continued)

OTHER PUBLICATIONS

Quanbao Zhou, John Houldcroft, "Cold engine cranking torque requirement analysis," SAE International Inc., 2007, JSAE 20077002.

(Continued)

*Primary Examiner* — Pedro J Cuevas
(74) *Attorney, Agent, or Firm* — Quinn IP Law

(57) ABSTRACT

A starter system for a powertrain comprises a brushless electric starter motor operatively connectable to an internal combustion engine. The starter system includes both an ultracapacitor power pack and a battery power pack. A nominal voltage of the ultracapacitor power pack is greater than that of the battery power pack. A DC-DC converter operatively connects the battery power pack and the ultracapacitor power pack and converts direct current at a first voltage level of the battery power pack to direct current at a greater second voltage level of the ultracapacitor power pack. An electronic control system is operable to control the brushless electric starter motor to start the engine using power provided from the ultracapacitor power pack, and to control the DC-DC converter to recharge the ultracapacitor power pack using power provided from the battery power pack through the DC-DC converter. A method of controlling the starter system is included.

19 Claims, 4 Drawing Sheets

(56) References Cited

U.S. PATENT DOCUMENTS

| | | | |
|---|---|---|---|
| 7,657,351 B2* | 2/2010 | Moran | B60K 6/12 701/22 |
| 7,680,568 B2* | 3/2010 | Moran | B60K 6/12 701/22 |
| 7,689,330 B2* | 3/2010 | Moran | B60K 6/12 701/22 |
| 7,689,331 B2* | 3/2010 | Moran | B60K 6/12 701/22 |
| 7,740,092 B2* | 6/2010 | Bender | B60L 50/30 180/65.29 |
| 7,806,095 B2* | 10/2010 | Cook | F02N 11/0866 123/179.3 |
| 8,134,343 B2* | 3/2012 | Like | B60R 16/04 320/166 |
| 8,408,341 B2* | 4/2013 | Dalum | B60L 50/16 180/65.22 |
| 8,544,575 B1* | 10/2013 | Scaringe | B60K 6/485 180/65.21 |
| 8,761,981 B2* | 6/2014 | Hussain | B60W 20/00 701/22 |
| 8,905,166 B2* | 12/2014 | Dalum | B60L 50/16 180/65.22 |
| 8,978,798 B2* | 3/2015 | Dalum | B60K 6/12 180/65.22 |
| 8,996,227 B2* | 3/2015 | Sisk | B60L 15/2045 701/26 |
| 9,121,380 B2 | 9/2015 | Fulton | |
| 9,174,525 B2* | 11/2015 | Caron | B60K 6/46 |
| 9,370,992 B2* | 6/2016 | Holmes | B60K 6/485 |
| 9,475,481 B2* | 10/2016 | Holmes | B60K 6/485 |
| 9,567,922 B2 | 2/2017 | Lofgren | |
| 9,586,575 B2* | 3/2017 | Holmes | B60K 6/485 |
| 9,597,979 B1* | 3/2017 | Hao | B60L 15/2045 |
| 9,816,475 B1* | 11/2017 | Buchanan | F02N 11/0866 |
| 9,878,607 B2* | 1/2018 | Caron | B60K 6/46 |
| 10,124,793 B2* | 11/2018 | Ciaccio | B60L 58/26 |
| 10,184,442 B2 | 1/2019 | Hao et al. | |
| 2001/0039230 A1 | 11/2001 | Severinsky et al. | |
| 2002/0153796 A1 | 10/2002 | Yoshinaga et al. | |
| 2003/0048024 A1 | 3/2003 | Chu | |
| 2003/0183430 A1 | 10/2003 | Naito et al. | |
| 2003/0189375 A1 | 10/2003 | Raad | |
| 2005/0099155 A1 | 5/2005 | Okuda et al. | |
| 2005/0140235 A1 | 6/2005 | Yamagishi et al. | |
| 2005/0236246 A1 | 10/2005 | Joki | |
| 2006/0116797 A1* | 6/2006 | Moran | B60K 6/12 701/22 |
| 2007/0007057 A1 | 1/2007 | Fujino et al. | |
| 2007/0018522 A1 | 1/2007 | Ackva et al. | |
| 2007/0068714 A1* | 3/2007 | Bender | B60L 50/30 180/65.29 |
| 2007/0124037 A1* | 5/2007 | Moran | B60K 6/12 701/22 |
| 2008/0012445 A1 | 1/2008 | Abe et al. | |
| 2008/0079389 A1 | 4/2008 | Howell et al. | |
| 2008/0097661 A1* | 4/2008 | Moran | B60K 6/12 701/22 |
| 2008/0147260 A1* | 6/2008 | Moran | B60K 6/12 701/22 |
| 2008/0177434 A1* | 7/2008 | Moran | B60K 6/12 701/22 |
| 2008/0193275 A1 | 8/2008 | De Filippis et al. | |
| 2008/0203846 A1 | 8/2008 | Hoemann et al. | |
| 2008/0265586 A1* | 10/2008 | Like | B60R 16/04 290/38 R |
| 2009/0024265 A1* | 1/2009 | Kortschak | B60K 6/485 701/22 |
| 2009/0085418 A1 | 4/2009 | Kobayashi et al. | |
| 2009/0107443 A1 | 4/2009 | Sarbacker et al. | |
| 2009/0179518 A1 | 7/2009 | Tajima et al. | |
| 2009/0206660 A1 | 8/2009 | Makita et al. | |
| 2010/0001523 A1 | 1/2010 | Sato et al. | |
| 2010/0145562 A1* | 6/2010 | Moran | B60K 6/46 701/22 |
| 2010/0300646 A1 | 12/2010 | Sawaguchi et al. | |
| 2011/0009235 A1 | 1/2011 | Song et al. | |
| 2011/0083919 A1* | 4/2011 | Kshatriya | B60L 53/305 180/65.26 |
| 2011/0267851 A1 | 11/2011 | Nagel et al. | |
| 2012/0025601 A1 | 2/2012 | Nefcy et al. | |
| 2012/0053011 A1 | 3/2012 | Onomura et al. | |
| 2012/0126614 A1 | 5/2012 | Inoue et al. | |
| 2012/0206109 A1 | 8/2012 | Fassnacht et al. | |
| 2013/0038271 A1 | 2/2013 | Park | |
| 2013/0106219 A1 | 5/2013 | Schneider et al. | |
| 2013/0138328 A1 | 5/2013 | Shimo et al. | |
| 2013/0154397 A1 | 6/2013 | Sullivan | |
| 2013/0300371 A1 | 11/2013 | Bills | |
| 2013/0320764 A1* | 12/2013 | Zeller | H02J 7/345 307/48 |
| 2014/0015364 A1 | 1/2014 | Iwatsu et al. | |
| 2014/0067183 A1* | 3/2014 | Sisk | B60W 20/00 701/22 |
| 2014/0244082 A1* | 8/2014 | Caron | B60K 6/46 701/22 |
| 2014/0260792 A1 | 9/2014 | Bradfield | |
| 2014/0292073 A1 | 10/2014 | Zhang et al. | |
| 2014/0319957 A1* | 10/2014 | Hao | H02K 17/16 310/211 |
| 2015/0105949 A1 | 4/2015 | Wright et al. | |
| 2015/0112536 A1 | 4/2015 | Severinsky et al. | |
| 2015/0224845 A1 | 8/2015 | Anderson et al. | |
| 2015/0239334 A1 | 8/2015 | El Baraka et al. | |
| 2015/0258881 A1* | 9/2015 | Holmes | B60K 6/485 477/3 |
| 2015/0283964 A1 | 10/2015 | Janarthanam | |
| 2015/0295459 A1 | 10/2015 | Hao et al. | |
| 2015/0303750 A1 | 10/2015 | Bouarroudj et al. | |
| 2016/0006311 A1 | 1/2016 | Li | |
| 2016/0032880 A1 | 2/2016 | Lovett et al. | |
| 2016/0046281 A1 | 2/2016 | Nedorezov et al. | |
| 2016/0052383 A1* | 2/2016 | Caron | B60K 6/46 |
| 2016/0056684 A1 | 2/2016 | Nemoto et al. | |
| 2016/0257190 A1* | 9/2016 | Holmes | B60K 6/485 |
| 2016/0290304 A1 | 10/2016 | Yukawa et al. | |
| 2016/0327007 A1* | 11/2016 | Averbukh | F02N 11/0866 |
| 2017/0008469 A1* | 1/2017 | Holmes | B60K 6/485 |
| 2017/0082012 A1 | 3/2017 | Jang | |
| 2017/0152828 A1 | 6/2017 | Bradfield | |
| 2017/0234285 A1* | 8/2017 | Huh | B60K 6/26 123/179.4 |
| 2017/0253231 A1* | 9/2017 | Ciaccio | B60L 58/26 |
| 2017/0327106 A1 | 11/2017 | Johri et al. | |
| 2017/0328329 A1* | 11/2017 | Buchanan | F02N 11/0866 |
| 2017/0334297 A1 | 11/2017 | Hao et al. | |
| 2017/0334422 A1 | 11/2017 | Namuduri et al. | |
| 2017/0338706 A1 | 11/2017 | Hao et al. | |
| 2018/0030944 A1 | 2/2018 | Raad | |
| 2018/0030945 A1 | 2/2018 | Caballero Atienzar | F02N 11/08 |
| 2018/0219377 A1* | 8/2018 | Laval | H02J 3/38 |
| 2018/0219381 A1* | 8/2018 | Laval | H02J 3/38 |
| 2018/0258900 A1 | 9/2018 | Namuduri et al. | |
| 2018/0298862 A1* | 10/2018 | Choi | F02N 11/0803 |
| 2018/0347534 A1* | 12/2018 | Lebreux | F02N 3/02 |
| 2018/0372200 A1* | 12/2018 | Kumar | B60W 20/11 |
| 2019/0077393 A1 | 3/2019 | Ciaccio | B60L 58/26 |
| 2019/0153988 A1* | 5/2019 | Lebreux | F02N 3/02 |
| 2019/0153989 A1* | 5/2019 | Lebreux | F02N 3/02 |
| 2019/0153990 A1* | 5/2019 | Lebreux | F02N 3/02 |

FOREIGN PATENT DOCUMENTS

| | | |
|---|---|---|
| CN | 102025248 A | 4/2011 |
| CN | 102923124 A | 2/2013 |
| DE | 102008040830 A1 | 2/2010 |
| DE | 102011056431 A1 | 6/2013 |
| EP | 0619427 B1 | 10/1994 |

(56) References Cited

FOREIGN PATENT DOCUMENTS

JP    2000104650 A    4/2000
JP    2003148317 A    5/2003

OTHER PUBLICATIONS

Hao et al., Utility U.S. Appl. No. 15/417,734, filed Jan. 27, 2017.
Namuduri et al., Utility U.S. Appl. No. 15/452,312, filed Mar. 7, 2017.
Hao et al., Utility U.S. Appl. No. 15/811,740, filed Nov. 14, 2017.
Namuduri et al., Utility U.S. Appl. No. 15/961,204, filed Apr. 24, 2018.
Namuduri et al., Utility U.S. Appl. No. 15/961,198, filed Apr. 24, 2018.
Lei Hao et al., Utility U.S. Appl. No. 15/961,176, filed Apr. 24, 2018.

* cited by examiner

STARTER SYSTEM AND METHOD OF CONTROL

INTRODUCTION

The present disclosure relates to a starter system such as for a powertrain, and to a method of controlling the starter system.

In an effort to improve fuel economy, many vehicles include an engine autostop event that occurs during a vehicle drive mode under certain conditions when propulsive torque is not required, such as when the vehicle is stopped at a stoplight, or when coasting on a highway. In powertrain design, weight, available packaging space, and efficiency of components are considerations.

SUMMARY

In the present disclosure, a starter system for a powertrain uses a brushless electric starter motor powered by an ultracapacitor power pack. A method for controlling a starter system having a brushless electric starter motor and an ultracapacitor power pack is also provided.

The brushless electric starter motor may provide advantages such as a long life-cycle, a relatively low inertia, and consistent and quick engine starts and restarts without a noticeable voltage dip, especially when used with the ultracapacitor power pack as described herein. For example, a brushless electric starter motor may obtain a predefined engine crankshaft rotational speed, such as 500 rpm, in a quicker period than a brush-type starter motor, with a lower inertia and the ability to fit within the same packaging space as a brush-type starter motor (i.e., without increase in size).

Current draw of a brushless electric starter motor may be advantageous because the peak current drawn by the brushless electric starter motor during cranking may be significantly lower than brushed starter motor configurations. The improved current draw performance reduces any voltage dip across the power bus used to power the motor during cranking, eliminating the need for supplemental power boosting during cranking. Additionally, the cranking power pulse of the ultracapacitor power pack is isolated from the low voltage power used to power vehicle loads, such that engine restarts are provided without voltage dips that cause light dimming or fan speed changes. Ultracapacitors are generally relatively inexpensive in comparison to some other types of power supplies, are quick to recharge, and provide a high pulse power output suitable for engine restarts even at relatively cold temperatures.

More specifically, a starter system for a powertrain disclosed herein includes a brushless electric starter motor selectively operatively connectable to an internal combustion engine included in the powertrain. The starter system includes both an ultracapacitor power pack and a battery power pack. A nominal voltage of the ultracapacitor power pack is greater than a nominal voltage of the battery power pack. The starter system includes a DC-DC converter operable to convert direct current at a first voltage level of the battery power pack to direct current at a second voltage level of the ultracapacitor power pack. The second voltage level is greater than the first voltage level. The ultracapacitor power pack may be sized to provide the necessary power for starting the internal combustion engine in accordance with the engine parameters (e.g., engine displacement, friction, size, etc.), using the relatively low battery power pack without a relatively high power and relatively expensive secondary battery system.

The starter system includes an electronic control system operable to control the brushless electric starter motor to start the internal combustion engine using power provided from the ultracapacitor power pack, and to control the DC-DC converter to recharge the ultracapacitor power pack using power provided from the battery power pack through the DC-DC converter.

The electronic control system may be operable to control the second voltage level to vary dependent upon at least one of a temperature of the ultracapacitor power pack or a state-of-function of the ultracapacitor power pack. A state-of-function of the ultracapacitor power pack may be dependent upon the age and usage of the ultracapacitor power pack, and is generally correlated with the power available. By setting voltage limits for the ultracapacitor power pack according to temperature and state-of-function of the ultracapacitor power pack, greater consistency in engine cold start, engine autostop, and engine restart performance may be achieved.

In an aspect, the starter system includes a power inverter operable to convert the direct current from the ultracapacitor power pack to multi-phase alternating current to drive the brushless electric starter motor.

In another aspect, the vehicle powertrain includes a ring gear operatively connected to a crankshaft of the internal combustion engine, and the starter system includes a pinion gear configured to be rotatably driven by the brushless electric starter motor. The pinion gear may be slidable, and the starter system may include a one-way clutch connecting a shaft of the brushless electric starter motor to the pinion gear. The pinion gear is movable between a disengaged position in which the pinion gear is disengaged from the ring gear, and an engaged position in which the pinion gear is meshingly engaged with the ring gear to transfer torque provided from the brushless electric starter motor to the crankshaft. A solenoid is operatively connected to the pinion gear. The electronic control system is operable to command the solenoid to a disabled state and alternately to an enabled state. The pinion gear moves to the disengaged position when the solenoid is in the disabled state, and moves to the engaged position when the solenoid is in the enabled state.

In an example, the electronic control system includes a powertrain controller and a motor controller. The powertrain controller may be configured to command the motor controller to energize the brushless electric starter motor, such as by using power from the ultracapacitor power pack through a power inverter that converts direct current to alternating current, and to separately command the solenoid to the enabled state to engage the pinion gear. Control of the pinion solenoid and the brushless electric starter motor may be via separate control signals, and without the need for an additional solenoid to enable the brushless electric starter motor, which may reduce a delay in response to a change of mind for an engine restart.

The electronic control system may control the brushless electric starter motor to start the internal combustion engine using power provided from the ultracapacitor power pack both during a cold start following a key crank, and during a drive mode following an engine autostop event. In one example, the electronic control system is configured to command an engine autostop event only if a voltage level of the ultracapacitor power pack is greater than a predetermined minimum voltage limit.

The battery power pack may be configured to power vehicle electrical loads via a power bus that is isolated from the ultracapacitor power pack and the brushless electric starter motor by the DC-DC converter. This may help to prevent voltage dips occurring upon engine start or restart from affecting vehicle electrical loads powered by the power bus.

In an example, the ultracapacitor power pack may include a plurality of ultracapacitors connected in series. In one example, the nominal voltage of the battery power pack is 12 Volts, the nominal voltage of the ultracapacitor power pack is at least 16 Volts, and the plurality of ultracapacitors may include six or seven ultracapacitors each having a capacitance of between about 400 Farads (F) and about 2000 F. In another example, the nominal voltage of the ultracapacitor power pack may be 48 Volts, and the plurality of ultracapacitors may include eighteen to twenty ultracapacitors each with a capacitance of ranging from 200 F to 1000 F.

A method of controlling a starter system for a powertrain is disclosed. The powertrain includes an internal combustion engine, and the starter system includes a brushless electric starter motor selectively operatively connectable to the internal combustion engine, an ultracapacitor power pack, a battery power pack, and a DC-DC converter operable to step up voltage from the battery power pack to the ultracapacitor power pack. The method includes receiving a powertrain wakeup signal, and determining, via an electronic control system, a current voltage level, a temperature, and a state-of-function of an ultracapacitor power pack in response to receiving the powertrain wakeup signal. The method further includes setting a charging voltage (V1) of the ultracapacitor power pack based on the current voltage level, the temperature, and the state-of-function of the ultracapacitor power pack, enabling output from the DC-DC converter to the ultracapacitor power pack, and charging the ultracapacitor power pack via power from the battery power pack until a voltage level (VC) of the ultracapacitor power pack is greater than or equal to the charging voltage (V1).

The method may accomplish cold starts of the engine using the brushless electric starter motor to crank the engine. For example, the method may include receiving an engine key crank signal, and, in response to the engine key crank signal, determining, via the electronic control system, whether the voltage level (VC) of the ultracapacitor power pack is greater than or equal to a difference between the charging voltage (V1) and a predetermined tolerance band ($\Delta V1$). The method may include commanding the solenoid to an enabled state to move the pinion gear into engagement with the engine ring gear if the voltage level (VC) of the ultracapacitor power pack is greater than or equal to the difference between the charging voltage (V1) and the predetermined tolerance band ($\Delta V1$), and enabling the brushless electric starter motor to start the internal combustion engine by energizing the brushless electric starter motor using power from the ultracapacitor power pack.

To complete the cold start, the method may further include monitoring one or more engine operating parameters, determining when the one or more engine operating parameters meet one or more predefined values indicative of a complete engine start, ceasing energizing of the brushless electric starter motor when the one or more engine operating parameters meet the predefined values, and commanding the solenoid to a disabled state to disengage the pinion gear from the engine ring gear when the one or more engine operating parameters meet the one or more predefined values.

The method may also accomplish engine autostops. For example, the method may include, during a drive mode, receiving one or more vehicle operating parameters satisfying one or more threshold conditions for an engine autostop event, determining an updated voltage level (VC), an updated temperature, and an updated state-of-function of the ultracapacitor power pack in response to receiving the one or more vehicle operating parameters. The method may then include setting a minimum voltage level (V2) of the ultracapacitor power pack, and commanding an engine autostop event in which fuel and spark to the internal combustion engine cease if the updated voltage level (VC) of the ultracapacitor power pack is greater than or equal to a sum of the minimum voltage level (V2) and a predetermined tolerance band ($\Delta V2$) for engine restart from the minimum voltage level (V2) of the ultracapacitor power pack.

The method may accomplish recharging of the ultracapacitor power pack during an engine autostop so that the ultracapacitor power pack is ready to be used for a subsequent engine restart. For example, following the engine autostop event, the method may include setting an updated charging voltage (V1) of the ultracapacitor power pack based on the updated voltage level (VC), the updated temperature, and the updated state-of-function of the ultracapacitor power pack. If the updated voltage level (VC) is less than a difference between the updated charging voltage (V1) and the predetermined tolerance band ($\Delta V1$), the method may include enabling output from the DC-DC converter to charge the ultracapacitor power pack to the updated charging voltage (V1) via power from the battery power pack until a voltage level of the ultracapacitor power pack is greater than or equal to the difference between the updated charging voltage (V1) and the predetermined tolerance band ($\Delta V1$).

To accomplish an engine restart event following the engine autostop event, the method may include receiving one or more vehicle operating parameters satisfying one or more threshold conditions for an engine restart event, and determining whether the updated voltage level (VC) of the ultracapacitor power pack is greater than or equal to the sum of the minimum voltage level (V2) of the ultracapacitor power pack and the predetermined tolerance band ($\Delta V2$). If the updated voltage level of the ultracapacitor power pack is greater than or equal to the sum of the minimum voltage level (V2) of the ultracapacitor power pack and the predetermined tolerance band ($\Delta V2$), the method may include commanding the solenoid to an enabled state to move the pinion gear into engagement with the engine ring gear, and after a predetermined amount of time since commanding the solenoid to the enabled state, energizing the brushless electric starter motor using power from the ultracapacitor power pack to restart the internal combustion engine.

To complete the engine restart event, the method may further include monitoring one or more engine operating parameters, determining when the one or more engine operating parameters meet one or more predefined values indicative of a complete engine restart, ceasing energizing of the brushless electric starter motor when the one or more engine operating parameters meet the predefined values, and commanding the solenoid to a disabled state to disengage the pinion gear from the engine ring gear when the one or more engine operating parameters meet the one or more predefined values.

If the updated voltage level (VC) of the ultracapacitor power pack is less than the sum of the minimum voltage level (V2) of the ultracapacitor power pack and the predetermined tolerance band ($\Delta V2$), then, prior to commanding the solenoid to the enabled state and prior to energizing the brushless electric starter motor using power from the ultracapacitor power pack, the method may include charging the ultracapacitor power pack to the updated charging voltage (V1) set until a voltage level of the ultracapacitor power pack is greater than or equal to a sum of the minimum voltage level (V2) of the ultracapacitor power pack and the predetermined tolerance band (ΔV2).

The above features and advantages and other features and advantages of the present disclosure are readily apparent from the following detailed description of the best modes for carrying out the disclosure when taken in connection with the accompanying drawings.

DETAILED DESCRIPTION

Figure 1:
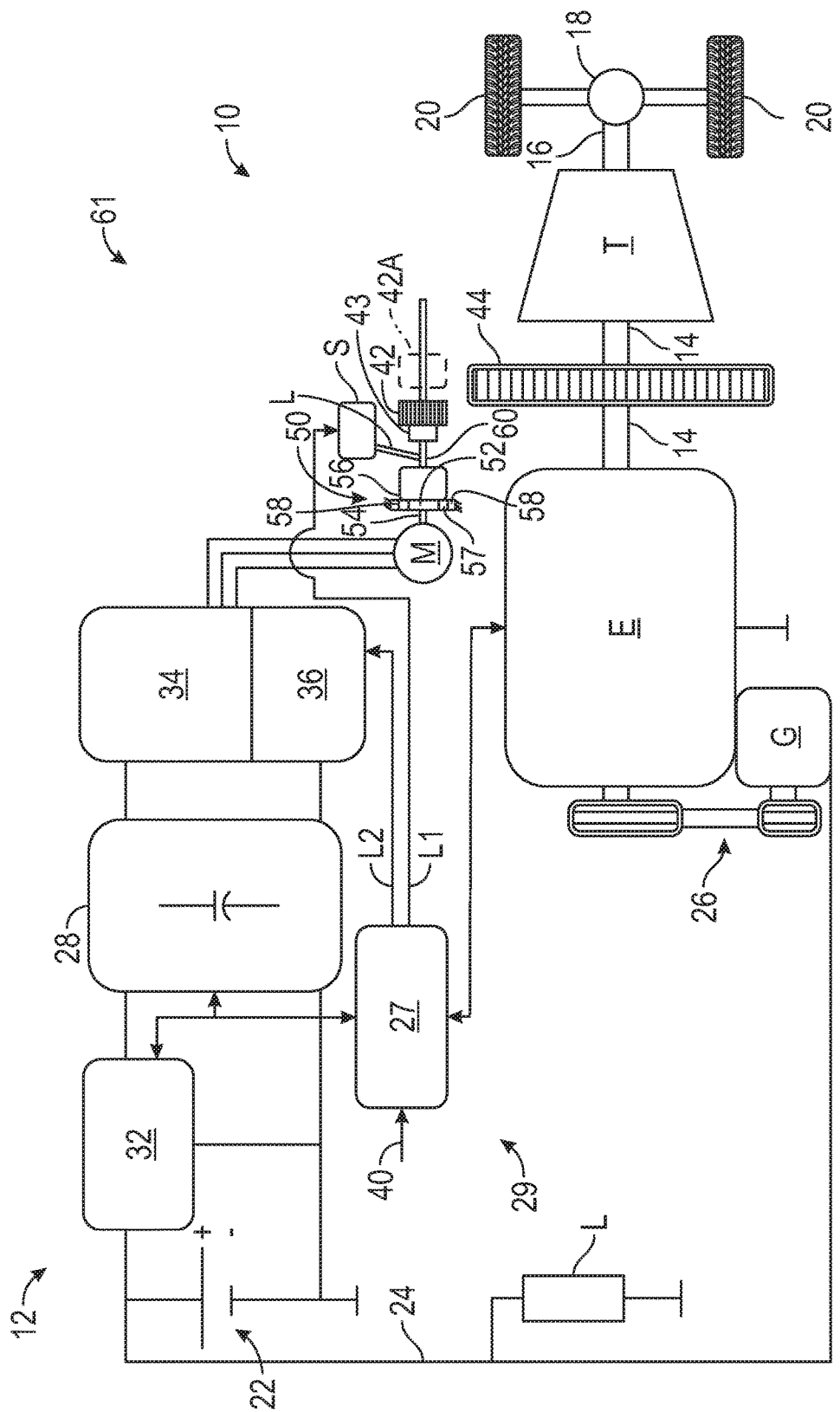
FIG. 1 is a schematic illustration of a vehicle including a powertrain with a starter system having a brushless electric starter motor, a battery power pack, and an ultracapacitor power pack.

Referring to the drawings, wherein like reference numbers refer to like components throughout the views, FIG. 1 shows a vehicle 10 that includes a powertrain 12. The powertrain 12 has an internal combustion engine E as the sole source of propulsion. Stated differently, the vehicle 10 is a non-hybrid vehicle. However, features of the powertrain 12 and a method 100 of controlling a starter system 61 of the vehicle powertrain 12 discussed herein could also be used on a hybrid vehicle.

The internal combustion engine E uses fuel that is provided to cylinders of the engine E and is combusted when a spark is introduced in the cylinders to drive a crankshaft 14 of the engine E to propel the vehicle 10. A transmission T has an input member driven by the crankshaft 14, and a plurality of intermeshing gears and torque-transmitting mechanisms (such as selectively engageable or fixed clutches and brakes) that allow for multiple speed ratios through the transmission T from the crankshaft 14 to an output member 16. The output member 16 is connected though a differential 18 and possibly additional ratio-changing components, such as a final drive, to vehicle wheels 20. Only one set of vehicle wheels 20 are shown for purposes of illustrating the features of the disclosure, but the vehicle 10 has two sets of wheels. The other set of wheels may or may not be driven by the transmission T.

The powertrain 12 includes a starter system with a brushless electric starter motor M that is used to start the engine E from a cold start, and to restart the engine E following an autostop during a drive mode. The brushless electric starter motor M is the only starter motor provided on the vehicle 10. In fact, the vehicle 10 does not include another electric motor used for starting the engine E or for vehicle propulsion. The engine E is the sole powerplant used for propulsion. However, in other embodiments, another electric motor could be included and used for propulsion in various operating modes, such as in an embodiment that is a hybrid electric vehicle.

The brushless electric starter motor M is configured with a higher voltage and higher power than a standard 12 Volt motor sometimes used on vehicles for engine starts. For example, in the embodiment shown, the brushless electric starter motor M may be a relatively higher nominal voltage than the battery power pack 22, such as at least 16 Volts, at least 18 Volts, 36 Volts, or 48 Volts. Brushless electric starter motors are advantageous as they may have a longer lifecycle, and may provide more consistent and quicker engine starts in comparison to other types of motors, including brush-type motors of a comparable size. In various configurations, the brushless electric starter motor M may be a switched reluctance motor, an interior permanent magnet motor, or another brushless motor of sufficient power to start and restart the engine E while being of a relatively small size (diameter and length) to fit within a packaging space of a brush-type starter motor of a lower voltage and power.

The starter system 61 includes a battery power pack 22 comprised of one or more battery cells and having a nominal voltage of 12 Volts. The battery power pack 22 supplies power to 12 Volt vehicle electrical loads L along a 12 Volt power bus 24, also referred to as the low voltage power bus. The powertrain 12 also includes a generator G rotatably driven by the engine crankshaft 14 via a belt and pulley arrangement 26. The generator G is controlled by a powertrain controller 27 included in the electronic control system 29 described herein to convert torque of the crankshaft 14 into electrical power that is provided to the battery power pack 22 to recharge the battery power pack 22 under certain vehicle operating conditions, such as during a regenerative braking mode.

Figure 2:
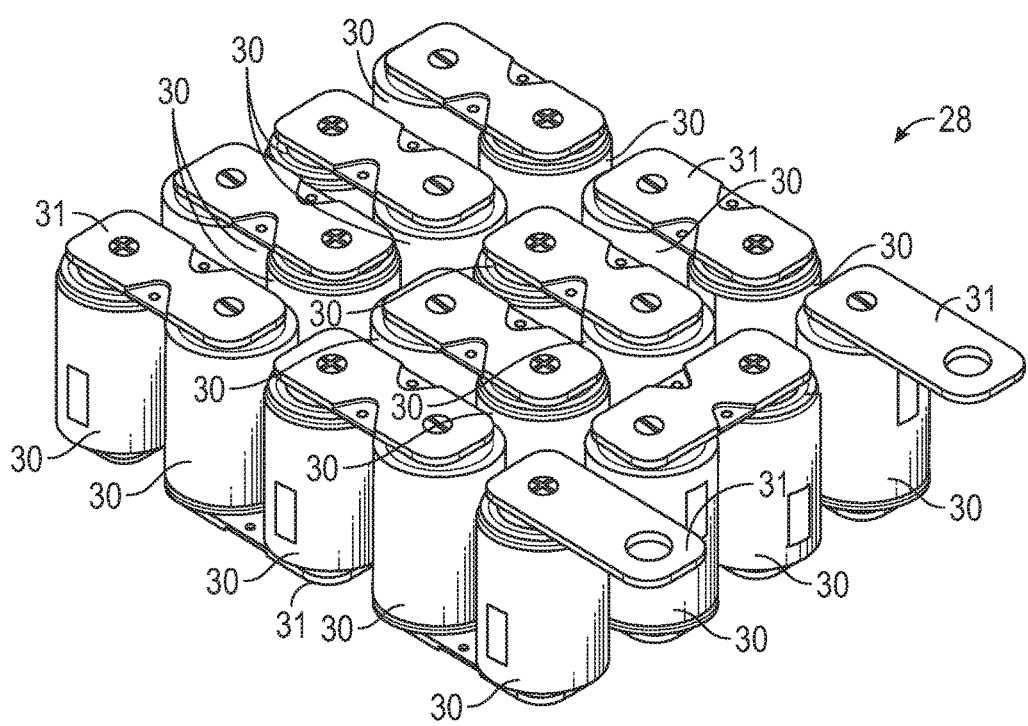
FIG. 2 is a schematic perspective illustration of the ultracapacitor power pack included in the powertrain of FIG. 1.

In order to provide power to the brushless electric starter motor M more quickly and at a higher voltage than possible with the battery power pack 22, an ultracapacitor power pack 28 is operatively connectable to the battery power pack 22 and to the brushless electric starter motor M as described herein. More specifically, with reference to FIG. 2, the ultracapacitor power pack 28 comprises a plurality of ultracapacitors 30 connected in series. The positive terminal of each ultracapacitor 30 is connected to the negative terminal of the following ultracapacitor with a conductor bar 31 (only some of which are numbered in FIG. 2), with the negative terminal of the first ultracapacitor 30 and the positive terminal of the last ultracapacitor 30 in the series available for connected to components in the powertrain 12.

The battery power pack 22 is made up of one or more battery cells that provide electrical power as a result of a chemical reaction. The ultracapacitors 30 of the ultracapacitor power pack 28 store energy in an electric field, enabling a faster charge and discharge than in a battery power pack, which is slowed by internal resistance to electric current.

In one example, the nominal voltage of the battery power pack 22 is 12 Volts, the nominal voltage of the ultracapacitor power pack 28 is at least 16 Volts, and the plurality of ultracapacitors 30 may include six or seven ultracapacitors each having a capacitance of between about 400 Farads (F) and about 2000 F. In another example, the nominal voltage of the ultracapacitor power pack 28 may be 48 Volts, and the plurality of ultracapacitors 30 may include eighteen to twenty ultracapacitors each with a capacitance of ranging from 200 F to 1000 F. In the exemplary embodiment shown, the plurality of ultracapacitors 30 includes twenty ultracapacitors 30, each with a capacitance of 500 F. By connecting the ultracapacitors 30 in series, the capacitance of the entire ultracapacitor power pack 28 is 25 F. In one example, if a 6 kilowatt, 0.5 second cranking pulse is provided by the ultracapacitor power pack 28 with a maximum current of 125 Amps during an engine cold start or an engine restart, the voltage drop of the ultracapacitor power pack 28 would be 2.5 Volts. A charging current requirement to recharge the ultracapacitor power pack 28 from a minimum voltage of 36 Volts to a voltage of 48 Volts in 30 seconds would be 10 Amps in such a configuration, and a suitable power requirement for the DC-DC converter 32 would be approximately 480 Watts.

The starter system 61 includes a DC-DC converter 32 that is configured to operatively connect the battery power pack 22 and the ultracapacitor power pack 28, and is operable to convert direct current at a first voltage level of the battery power pack 22 to direct current at a second voltage level of the ultracapacitor power pack 28, The second voltage level is greater than the first voltage level. The DC-DC converter 32 is controlled by the control system as described herein.

The starter system 61 also includes a power inverter 34 operable to convert the direct current from the ultracapacitor power pack 28 to multi-phase alternating current required to drive the brushless electric starter motor M. The power inverter 34 may be included in a module with a motor controller 36 that is included in the electronic control system 29 of the powertrain 12.

The starter system 61 includes an electric pinion solenoid S with a pinion gear 42. The electric pinion solenoid S is operatively connected to the powertrain controller 27 and has an energized state and a deenergized state. The pinion gear 42 is configured to be rotatably driven by the brushless electric starter motor M and movable between a disengaged position shown in FIG. 1, in which the pinion gear 42 is disengaged from a ring gear 44, and an engaged position shown in phantom as 42A in which teeth of the pinion gear 42 are meshingly engaged with teeth of the ring gear 44 that is mounted to rotate with the crankshaft 14 (such as by mounting the ring gear 44 to a flywheel or flex plate of the engine E) to transfer torque provided from the brushless electric starter motor M to the crankshaft 14. In the embodiment shown, the pinion gear 42 is in the disengaged position shown in FIG. 1 when the solenoid S is in the deenergized state, and is in the engaged position when the solenoid S is in the energized state. The solenoid S may receive electric power from the battery power pack 22 or from the ultracapacitor power pack 28 causing a piston within the solenoid S to move a lever L that causes the pinion gear 42 to move to the engaged position 42A in FIG. 1. An overrunning one-way clutch 43 may be operatively disposed between the output shaft 60 and the pinion gear 42 and configured such that, if the ring gear 44 tries to back drive the pinion gear 42 once the engine E starts running and with the pinion gear 42 in the engaged position 42A, the pinion gear 42 will freewheel and will not back drive the brushless electric starter motor M to higher speeds, so that the brushless electric starter motor M is not damaged by excessive induced voltages. The one-way clutch 43 is attached to the pinion gear 42 and is axially slidable along the shaft 60 with the pinion gear 42 during engagement of the pinion gear 42 with the ring gear 44.

In order to reduce rotational speed and increase torque from the brushless electric starter motor M to the pinion gear 42, the starter system 61 may include gear reduction such as through a planetary gear set 50 that includes a sun gear 52 mounted to and rotating at the same speed as a motor shaft 54 of the brushless electric starter motor M, a ring gear 58 (i.e., an internal ring gear) that may be grounded, and carrier 56 supporting a plurality of pinion gears 57 that mesh with the sun gear 52 and the ring gear 58. The carrier 56 is connected to rotate with a shaft extension 60 that is coaxial with the motor shaft 54, and on which the pinion gear 42 and the overrunning one-way clutch 43 are axially slidable in response to energizing and deenergizing of the pinion solenoid S as discussed herein. The brushless electric starter motor M, the power inverter 34, the motor controller 36, the pinion solenoid S, the pinion gear 42, the overrunning one-way clutch 43, the shaft 54, the shaft extension 60, and the components of the reduction gear set 50 are included in the starter system 61.

The electronic control system 29 is shown with two separate controllers: the powertrain controller 27 and the motor controller 36. Although the powertrain controller 27 and the motor controller 36 are shown as separate controllers, in some embodiments, they may be integrated. Additionally, the powertrain controller 27 may also be any one of, an integrated combination of, or may be operatively connected to additional controllers included in the powertrain control system 29, such as an engine controller and/or a transmission controller. Each of the controllers 27, 36 has a requisite memory and a processor, as well as other associated hardware and software, e.g., a clock or timer, input/output circuitry, etc. In an embodiment, the memory may include sufficient amounts of read only memory, for instance magnetic or optical memory. For example, instructions embodying the method 100 may be programmed as computer-readable instructions into the memory of and executed by the processor of the powertrain controller 27 during operation of the vehicle 10.

The motor controller 36 may be operatively connected to the powertrain controller 27 and responsive to electronic control signals configured to command the motor controller 36 to enable power flow from the ultracapacitor power pack 28 as direct current from the relatively high voltage ultracapacitor power pack 28 through the power inverter 34 which converts the current to alternating current provided to the brushless electric starter motor M. The powertrain controller 27 receives vehicle and engine operating parameters 40 such as accelerator and brake pedal position information (or equivalent information related to acceleration demand such as when not input by such pedals, such as in an autonomous vehicle), vehicle speed, engine speed, the state of charge of the battery power pack 22, and the status of relatively high vehicle loads such as air conditioning, etc. The powertrain controller 27 is further in communication with the DC-DC converter 32, the ultracapacitor power pack 28, the motor controller 36, the engine E, and the pinion solenoid S. The powertrain controller 27 is separately in signal communication with the pinion solenoid S and the motor controller 36 as indicated by separate control lines L1 and L2. This enables quick response time of powertrain 12 during an autostop and/or a restart event as described herein, and enables a change-of-mind for an engine restart without requiring a second solenoid to energize the motor M.

As shown, the powertrain controller 27 receives engine operating conditions from various sensors on the engine E, receives information regarding operating conditions of the ultracapacitor power pack 28, such as temperature $T_C$ and age and usage information to assign a state-of-function (SoF) of the ultracapacitor power pack 28. Temperature $T_C$ and state-of-function SoF are indicative of a desirable charging voltage V1 of the ultracapacitor power pack 28 according to a stored algorithm or a lookup table stored in the memory of the powertrain controller 27.

The electronic control system 29 is configured to control the powertrain 12 according to the method 100 which includes charging the ultracapacitor power pack 28 using energy stored in the battery power pack 22 during a wakeup mode, starting the engine E from a cold start using the brushless electric starter motor M during an engine key crank mode, carrying out an autostop event in which the engine E is stopped during a drive mode, and carrying out an engine restart event in which the engine E may be restarted during the drive mode using the brushless electric starter motor M following the autostop.

Figure 3A:
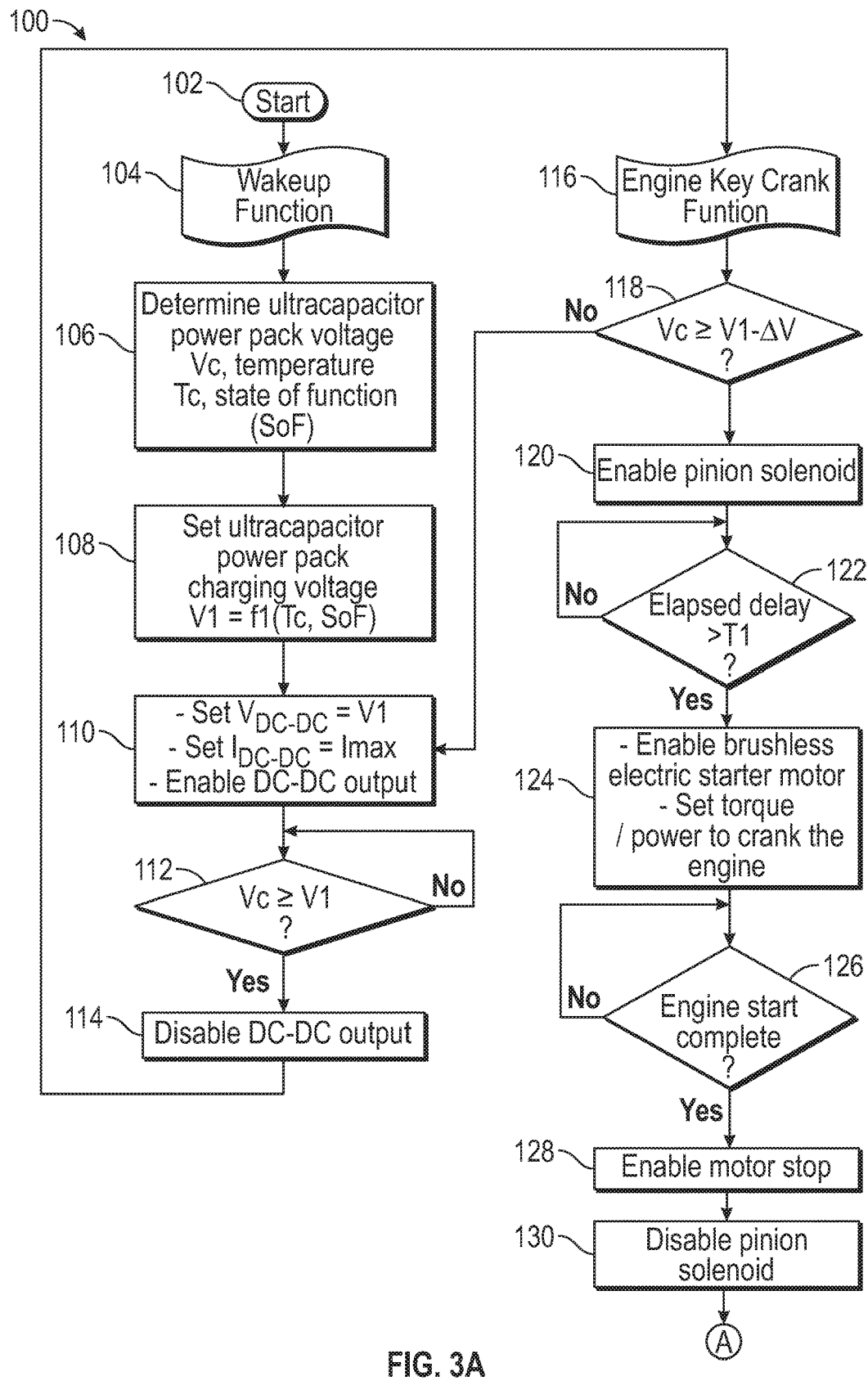
FIG. 3A is a schematic flow diagram of portions of a method of controlling the starter system of FIG. 1, including a function for charging the ultracapacitor power pack on electronic control system wakeup, and a function for starting the engine with the brushless electric starter motor from a cold start.

Referring to FIG. 3A, the method 100 begins at start 102, and in step 104, the powertrain controller 27 receives a powertrain wakeup signal as a vehicle operating parameter 40 to begin a wakeup function. The powertrain wakeup signal may be an indication of a key-on position or the equivalent indication of an imminent engine key crank. Following step 104, the method 100 proceeds to step 106 in which the powertrain controller 27 determines the current voltage level VC of the ultracapacitor power pack 28, as well as the temperature $T_C$ and the state-of-function SoF of the ultracapacitor power pack 28. This may be done by a combination of sensors and stored algorithms relating the sensed data to corresponding voltage level, temperature, and state-of-function values. In the drawings, "Y" represents an affirmative answer to a query, and "N" represents a negative answer.

Following step 106, the method 100 proceeds to step 108, in which the powertrain controller 27 sets a charging voltage V1 of the ultracapacitor power pack 28 based on the current voltage level, the temperature, and the state-of-function of the ultracapacitor power pack 28 as determined in step 106. The method 100 then proceeds to step 110, in which the powertrain controller 27 carries out three substeps: substep (i): setting the output voltage $V_{DC-DC}$ of the DC-DC converter 32 as the charging voltage V1; substep (ii): setting the output current DC-Dc of the DC-DC converter 32 as the maximum current $I_{MAX}$ possible in order to expedite charging of the ultracapacitor power pack 28; and substep (iii) enabling output from the DC-DC converter 32 to the ultracapacitor power pack 28 so that the ultracapacitor power pack 28 is charged using energy stored in the battery power pack 22.

The method 100 then proceeds to step 112 in which the powertrain controller 27 monitors the voltage $V_C$ of the ultracapacitor power pack 28 to determine whether it is greater than or equal to the set charging voltage V1. If it is not, the method 100 continues monitoring and charging the ultracapacitor power pack 28, until the voltage $V_C$ of the ultracapacitor power pack 28 is greater than or equal to the set charging voltage V1, at which point the method 100 proceeds to step 114 in which the output of the DC-DC converter 32 is disabled so that charging of the ultracapacitor power pack 28 ceases.

Ideally, charging of the ultracapacitor power pack 28 to a voltage $V_C$ greater than or equal to the set charging voltage V1 occurs prior to block 116 in which the powertrain controller 27 enters an engine key crank function when it receives an engine key crank signal as one of the vehicle operating parameters 40. In response to the engine key crank signal, the method 100 proceeds to step 118, in which the powertrain controller 27 determines whether the voltage level $V_C$ of the ultracapacitor power pack 28 is greater than or equal to a difference between the charging voltage V1 and a predetermined tolerance band ΔV. The predetermined tolerance band ΔV is caused by the added load of the brushless electric starter motor M starting, and can be predetermined based on the parameters of the brushless electric starter motor M and may also be partially dependent on the current voltage level VC of the ultracapacitor power pack 28, as well as the temperature $T_C$ and the state-of-function SoF of the ultracapacitor power pack 28.

If the voltage level $V_C$ of the ultracapacitor power pack 28 is not determined to be greater than or equal to a difference between the charging voltage V1 and a predetermined tolerance band ΔV in step 118, then the method 100 returns to step 110 so that the ultracapacitor power pack 28 can continue to be charged through the DC-DC converter 32 using energy stored in the battery power pack 22, and repeats steps 112 and 114 until the query of step 118 is satisfied.

Accordingly, if the voltage level $V_C$ of the ultracapacitor power pack 28 is determined to be greater than or equal to a difference between the charging voltage V1 and the predetermined tolerance band ΔV in step 118, then the method 100 proceeds to step 120 and the powertrain controller 27 commands the pinion solenoid S to the enabled state (also referred to as enabling the pinion solenoid S) to move the pinion gear 42 into position 42A in engagement with the engine ring gear 44.

Following step 120, the method 100 proceeds to step 122 and the powertrain controller 27 sets a timer (which may be internal to the powertrain controller 27) to wait until time elapsed since the pinion solenoid S was enabled in step 120 is at least a first amount of time T1. Once the first amount of time T1 has elapsed, the method 100 proceeds to step 124 and the powertrain controller 27 carries out the following substeps: in substep (i) the powertrain controller 27 commands the motor controller 36 to enable output from the power inverter 34, and in substep (ii) the motor controller 36 via the command from the powertrain controller 27 sets the torque and power of the brushless electric starter motor M so that the brushless electric starter motor M is energized to crank the engine E (i.e., causes the crankshaft 14 to rotate) using power from the ultracapacitor power pack 28. Fuel and spark are also enabled.

Following step 124, the method 100 proceeds to step 126, in which the powertrain controller 27 monitors one or more engine operating parameters 40, such as rotational speed, amount of fuel dispensed in the cylinders, and time elapsed since the brushless electric starter motor M was energized, and determines when the engine operating parameters meet predefined values indicative of a complete engine start. For example, a complete engine start may be defined as a rotational speed of the crankshaft of 500 rpm, and a predefined volume of fuel dispensed.

Following satisfaction of the predetermined engine operating parameters indicative of a complete engine start in step 126, the method 100 proceeds to step 128 in which the powertrain controller 27 commands the motor controller 36 to cease energizing of the brushless electric starter motor M (also referred to herein as enabling motor stop), and then to step 130 in which the powertrain controller 27 commands the pinion solenoid S to a disabled state (also referred to herein as disabling the pinion solenoid S) to disengage the pinion gear 42 from the engine ring gear 44.

Figure 3B:
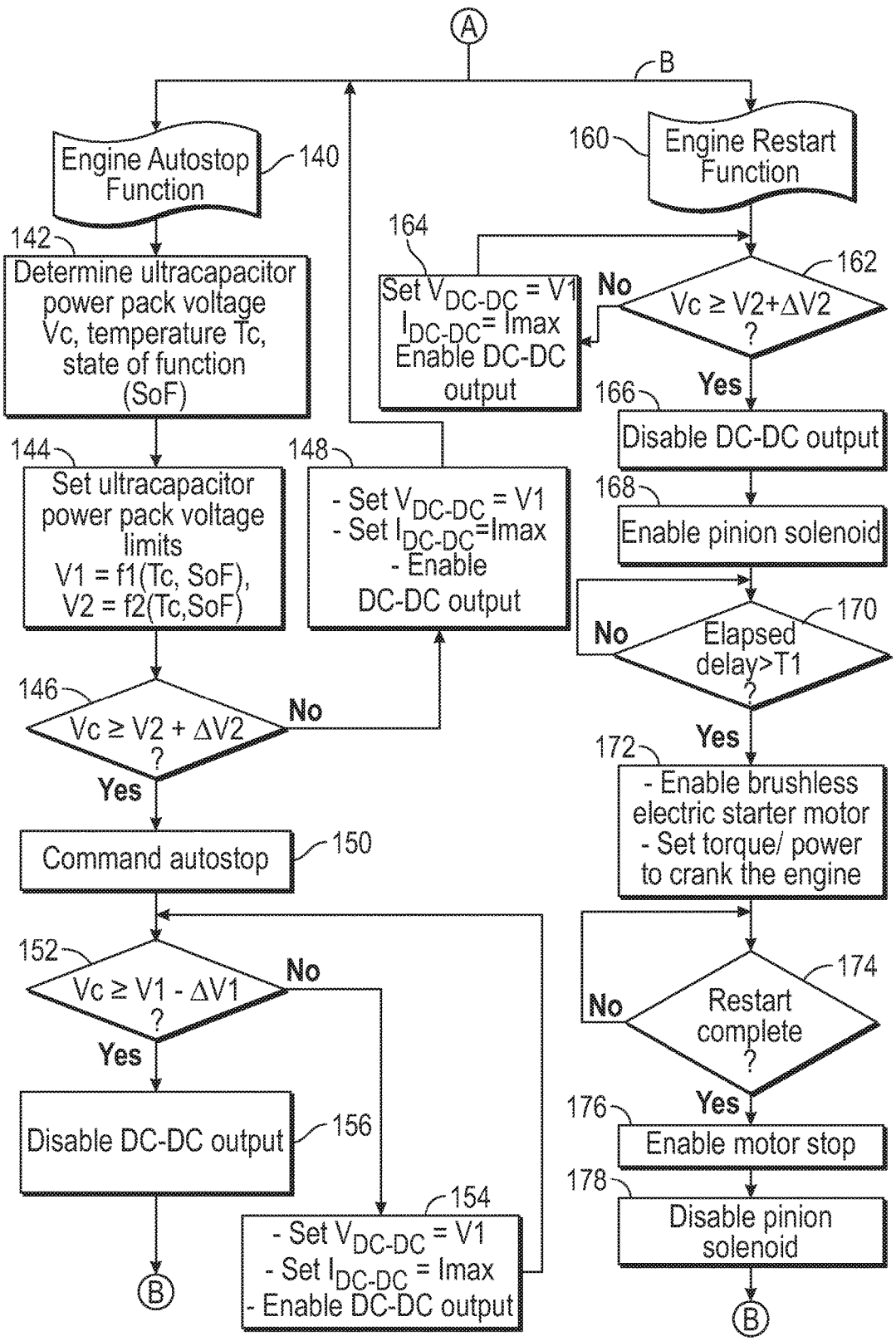
FIG. 3B is a schematic flow diagram of additional portions of the method of controlling the starter system of FIG. 1, including an engine autostop function and an engine restart function.

Following the completion of the cold start of the engine E, and the motor stop and pinion solenoid S disablement in steps 128 and 130, the method 100 continues in FIG. 3B (as indicated by block A in FIG. 3A repeated at the top of FIG. 3B) in a drive mode, generally indicated at B in FIG. 3B, and encompassing the steps shown in FIG. 3B in the autostop function and the engine restart function as described herein. During the drive mode B of the vehicle 10 (as may be indicated, for example, by a position of a PRNDL transmission gear selector or by other vehicle or engine operating parameters 40), the powertrain controller 27 may receive vehicle operating parameters 40 in step 140 that satisfy one or more preset threshold conditions for an engine autostop event, triggering the engine autostop function. For example, a rotational speed of the wheels 20 at or near zero and a fully depressed vehicle brake pedal may be one set of preset threshold conditions, and there may be other preset initial conditions for cruising during drive mode in which an engine autostop event may be considered.

Following step 140, in response to receiving the vehicle operating parameters 40, the method 100 proceeds to step 142 in which the powertrain controller 27 determines an updated voltage level VC of the ultracapacitor power pack 28, as well as an updated temperature $T_C$ and an updated state-of-function SoF of the ultracapacitor power pack 28. This may be done by any combination of sensors and stored algorithms relating the sensed data to corresponding voltage level, temperature, and state-of-function values.

Based on the updated voltage level VC, temperature $T_C$, and state-of-function SoF of the ultracapacitor power pack 28 determined in step 142, the method 100 proceeds to step 144 in which the powertrain controller 27 sets a minimum voltage level V2 of the ultracapacitor power pack in substep (i) of step 140, and sets an updated charging voltage V1 of the ultracapacitor power pack in substep (ii) of step 140.

Once the ultracapacitor voltage limits are set in step 144, the method 100 optionally proceeds to step 146 to determine if the updated voltage level VC of the ultracapacitor power pack 28 is greater than or equal to a sum of the minimum voltage level V2 and a predetermined tolerance band $\Delta V2$ for engine restart from the minimum voltage level V2 of the ultracapacitor power pack 28. If the updated voltage level VC is not greater than or equal to the sum of the minimum voltage level V2 and the predetermined tolerance band $\Delta V2$, then the method 100 does not carry out an engine autostop, and instead proceeds to step 148, in which the following substeps are carrier out: substep (i) setting the voltage of the DC-DC converter 32 to the updated charging voltage V1; substep (ii) setting the current of the DC-DC converter 32 to the maximum current $I_{MAX}$, and substep (iii) enabling output from the DC-DC converter 32 to charge the ultracapacitor power pack 28 to the updated charging voltage V1 via power from the battery power pack 22 until a voltage level of the ultracapacitor power pack 28 is greater than or equal to the difference between the updated charging voltage V1 and the predetermined tolerance band $\Delta V1$, and then enters the enters the engine autostop function 140 if vehicle operating parameters 40 still indicate that the one or more threshold conditions for commanding an autostop event are satisfied.

If in step 146 it is instead determined that the updated voltage level VC of the ultracapacitor power pack 28 is greater than or equal to a sum of the minimum voltage level V2 and the predetermined tolerance band $\Delta V2$ for engine restart from the minimum voltage level V2 of the ultracapacitor power pack 28, the method 100 proceeds to step 150 in which the method 100 commands an engine autostop in which fuel and spark to the internal combustion engine E ceases.

Once autostop is commanded in step 150, the method 100 proceeds to step 152 in which the powertrain controller 27 determines if the updated voltage level VC is greater than or equal to a difference between the updated charging voltage V1 and a predetermined tolerance band $\Delta V1$ that will occur if the engine 10 is restarted with the ultracapacitor power pack 28 at the updated charging voltage V1. If the updated voltage level VC is not greater than or equal to a difference between the updated charging voltage V1 and a predetermined tolerance band $\Delta V1$, then the method 100 proceeds to step 154 in which in the following substeps occur: substep (i) the voltage of the DC-DC converter 32 is set to the updated charging voltage V1; substep (ii) the current of the DC-DC converter 32 is set to the maximum current $I_{MAX}$, and substep (iii) output from the DC-DC converter 32 is enabled to charge the ultracapacitor power pack 28 until the voltage level VC of the ultracapacitor power pack 28 is greater than or equal to a difference between the updated charging voltage V1 and the predetermined tolerance band $\Delta V1$, at which point the method 100 proceeds to step 156 and disables output from the DC-DC converter 32. Following step 156, the method 100 exits the engine autostop function and returns to B (as the vehicle 10 remains in the drive mode), awaiting vehicle operating parameters 40 that will trigger entrance into a subsequent function, such as an engine restart function.

If the powertrain controller 27 receives vehicle operating parameters 40 satisfying one or more preset threshold conditions for an engine restart event in step 160, the method 100 enters an engine restart function. For example, the preset initial conditions may include a lifting of the brake pedal, depression of the accelerator pedal, etc.

Following satisfaction of the preset threshold conditions and entrance into the restart mode at step 160, the powertrain controller 27 determines in step 162 whether the updated voltage level VC of the ultracapacitor power pack 28 (i.e. the current voltage level) is greater than or equal to the sum of the minimum voltage level V2 of the ultracapacitor power pack 28 and the predetermined tolerance band $\Delta V2$ that will occur if the engine E were to be restarted with the ultracapacitor power pack 28 at the minimum voltage level V2. If the updated voltage level VC of the ultracapacitor power pack 28 is not greater than or equal to the sum of the minimum voltage level V2 of the ultracapacitor power pack 28 and the predetermined tolerance band $\Delta V2$, then the method 100 proceeds to step 164, in which the following occurs: in substep (i) the voltage of the DC-DC converter 32 is set to the updated charging voltage V1, in substep (ii) the current of the DC-DC converter 32 is set to the maximum current $I_{MAX}$, and in substep (iii) output from the DC-DC converter 32 is enabled to charge the ultracapacitor power pack 28 until the voltage level VC of the ultracapacitor power pack 28 is greater than or equal to the sum of the minimum voltage level V2 of the ultracapacitor power pack 28 and the predetermined tolerance band $\Delta V2$, at which point the method 100 proceeds to step 166 and disables output from the DC-DC converter 32.

With the updated voltage level VC satisfying the engine restart threshold conditions of step 162, the method proceeds to step 168, in which the powertrain controller 27 commands the solenoid S to the enabled state to move the pinion gear 42 into engagement with the engine ring gear 44 (i.e., to position 42A). To ensure engagement with the engine ring gear 44, the method 100 may include step 170 in which the powertrain controller 27 sets a timer (which may be internal to the powertrain controller 27) to wait until time elapsed since the pinion solenoid S was enabled in step 168 is at least the first amount of time T1 as in step 122 or, optionally, a different amount of time. Once the amount of time T1 has elapsed, the method 100 proceeds to step 172 in which the following occurs: in substep (i) the powertrain controller 27 commands the motor controller 36 to enable output from the power inverter 34 (i.e., enables the brushless electric starter motor), and in substep (ii) sets the torque and power of the brushless electric starter motor M so that the brushless electric starter motor M is energized to crank the engine E (i.e., causes the crankshaft 14 to rotate) using power from the ultracapacitor power pack 28. Fuel and spark are also enabled.

Following step 172, the method 100 proceeds to step 174, in which the powertrain controller 27 monitors one or more engine operating parameters, such as crankshaft rotational speed, amount of fuel dispensed in the cylinders, and time elapsed since the brushless electric starter motor M was energized, and determines when the engine operating parameters meet predefined threshold values indicative of a complete engine restart. For example, a complete engine restart may be defined as a rotational speed of the crankshaft 14 of greater than or equal to 500 rpm sustained for a predefined amount of time following enablement of the brushless electric starter motor M, and a predefined volume of fuel dispensed.

Following satisfaction of the predetermined threshold values indicative of a complete engine start in step 174, the method 100 proceeds to step 176 in which the powertrain controller 27 commands the motor controller 36 to cease energizing of the brushless electric starter motor M, and then to step 178 in which the powertrain controller 27 commands the pinion solenoid S to the disabled state to disengage the pinion gear 42 from the engine ring gear 44. The method 100 then exits the engine restart function and returns to B as the vehicle 10 remains in drive mode.

While the best modes for carrying out the disclosure have been described in detail, those familiar with the art to which this disclosure relates will recognize various alternative designs and embodiments for practicing the disclosure within the scope of the appended claims.

What is claimed is:

1. A starter system for use with a powertrain having an internal combustion engine, the starter system comprising:
   a brushless electric starter motor selectively operatively connectable to the internal combustion engine;
   an ultracapacitor power pack;
   a battery power pack; wherein a nominal voltage of the ultracapacitor power pack is greater than a nominal voltage of the battery power pack;
   a DC-DC converter operable to convert direct current at a first voltage level of the battery power pack to direct current at a second voltage level of the ultracapacitor power pack, wherein the second voltage level is greater than the first voltage level; and
   an electronic control system operable to control the brushless electric starter motor to start the internal combustion engine using power provided from the ultracapacitor power pack, and to control the DC-DC converter to recharge the ultracapacitor power pack using power provided from the battery power pack through the DC-DC converter.

2. The starter system of claim 1, further comprising:
   a power inverter operable to convert the direct current from the ultracapacitor power pack to multi-phase alternating current to drive the brushless electric starter motor.

3. The starter system of claim 1, wherein the powertrain includes a ring gear operatively connected to a crankshaft of the internal combustion engine, and the starter system further comprising:
   a pinion gear configured to be rotatably driven by the brushless electric starter motor and movable between a disengaged position in which the pinion gear is disengaged from the ring gear, and an engaged position in which the pinion gear is meshingly engaged with the ring gear to transfer torque provided from the brushless electric starter motor to the crankshaft;
   a solenoid operatively connected to the pinion gear; and
   wherein the electronic control system is operable to command the solenoid to a disabled state and alternately to an enabled state, wherein the pinion gear moves to the disengaged position when the solenoid is in the disabled state, and moves to the engaged position when the solenoid is in the enabled state.

4. The starter system of claim 3, wherein the electronic control system includes a powertrain controller and a motor controller; wherein the powertrain controller is configured to command the motor controller to energize the brushless electric starter motor and to separately command the solenoid to the enabled state to engage the pinion gear.

5. The starter system of claim 1, wherein the electronic control system controls the brushless electric starter motor to start the internal combustion engine using power provided from the ultracapacitor power pack both during a cold start following a key crank, and during a drive mode following an engine autostop event.

6. The starter system of claim 5, wherein the electronic control system is configured to command an engine autostop event only if a voltage level of the ultracapacitor power pack is greater than a predetermined minimum voltage limit.

7. The starter system of claim 1, wherein the battery power pack is configured to power vehicle electrical loads via a power bus that is isolated from the ultracapacitor power pack and the brushless electric starter motor by the DC-DC converter.

8. The starter system of claim 1, wherein the ultracapacitor power pack comprises a plurality of ultracapacitors connected in series.

9. The starter system of claim 8, wherein the nominal voltage of the battery power pack is 12 Volts and the nominal voltage of the ultracapacitor power pack is at least 16 Volts.

10. The starter system of claim 9, wherein the nominal voltage of the ultracapacitor power pack is 48 Volts, and the plurality of ultracapacitors includes twenty ultracapacitors each with a capacitance of 500 F.

11. The starter system of claim 1, wherein the electronic control system is operable to control the second voltage level to vary dependent upon at least one of a temperature of the ultracapacitor power pack or a state-of-function of the ultracapacitor power pack.

12. A method of controlling a starter system for a powertrain, the method comprising:
   receiving a powertrain wakeup signal; wherein the powertrain includes an internal combustion engine, wherein the starter system includes a brushless electric starter motor selectively operatively connectable to the internal combustion engine, an ultracapacitor power pack, a battery power pack, and a DC-DC converter operable to step up voltage from the battery power pack to the ultracapacitor power pack;
   determining, via an electronic control system, a current voltage level (VC), a temperature, and a state-of-function of the ultracapacitor power pack in response to receiving the powertrain wakeup signal;
   setting a charging voltage (V1) of the ultracapacitor power pack based on the current voltage level, the temperature, and the state-of-function of the ultracapacitor power pack;
   enabling output from the DC-DC converter to the ultracapacitor power pack; and charging the ultracapacitor power pack via power from the battery power pack until the voltage level (VC) of the ultracapacitor power pack is greater than or equal to the charging voltage (V1).

13. The method of claim 12, wherein the powertrain further includes an engine ring gear connected with a crankshaft of the internal combustion engine, and the method further comprising:
receiving an engine key crank signal;
in response to the engine key crank signal, determining, via the electronic control system, whether the voltage level (VC) of the ultracapacitor power pack is greater than or equal to a difference between the charging voltage (V1) and a predetermined tolerance band (ΔV1);
commanding the solenoid to an enabled state to move the pinion gear into engagement with the engine ring gear if the voltage level (VC) of the ultracapacitor power pack is greater than or equal to the difference between the charging voltage (V1) and the predetermined tolerance band (ΔV1); and
enabling the brushless electric starter motor to start the internal combustion engine by energizing the brushless electric starter motor using power from the ultracapacitor power pack.

14. The method of claim 13, further comprising:
monitoring one or more engine operating parameters;
determining when the one or more engine operating parameters meet one or more predefined values indicative of a complete engine start;
ceasing energizing of the brushless electric starter motor when the one or more engine operating parameters meet the predefined values; and
commanding the solenoid to a disabled state to disengage the pinion gear from the engine ring gear when the one or more engine operating parameters meet the one or more predefined values.

15. The method of claim 12, further comprising:
during a drive mode:
receiving one or more vehicle operating parameters satisfying one or more preset threshold conditions for an engine autostop event;
determining an updated voltage level (VC), an updated temperature and an updated state-of-function of the ultracapacitor power pack in response to receiving the one or more vehicle operating parameters;
setting a minimum voltage level (V2) of the ultracapacitor power pack; and
commanding an engine autostop event in which fuel and spark to the internal combustion engine cease if the updated voltage level (VC) of the ultracapacitor power pack is greater than or equal to a sum of the minimum voltage level (V2) and a predetermined tolerance band (ΔV2) for engine restart from the minimum voltage level (V2) of the ultracapacitor power pack.

16. The method of claim 15, further comprising:
setting an updated charging voltage (V1) of the ultracapacitor power pack based on the updated voltage level (VC), the updated temperature, and the updated state-of-function of the ultracapacitor power pack;
following the engine autostop event, if the updated voltage level (VC) is less than a difference between the updated charging voltage (V1) and the predetermined tolerance band (ΔV1), enabling output from the DC-DC converter to charge the ultracapacitor power pack to the updated charging voltage (V1) via power from the battery power pack until a voltage level of the ultracapacitor power pack is greater than or equal to the difference between the updated charging voltage (V1) and the predetermined tolerance band (ΔV1).

17. The method of claim 16, wherein the powertrain further includes an engine ring gear connected with a crankshaft of the internal combustion engine, and the starter system further includes a pinion gear and a solenoid, and the method further comprising:
following the engine autostop event:
receiving one or more vehicle operating parameters satisfying one or more preset threshold conditions for an engine restart event;
determining whether the updated voltage level (VC) of the ultracapacitor power pack is greater than or equal to the sum of the minimum voltage level (V2) of the ultracapacitor power pack and the predetermined tolerance band (ΔV2);
if the updated voltage level (VC) of the ultracapacitor power pack is greater than or equal to the sum of the minimum voltage level (V2) of the ultracapacitor power pack and the predetermined tolerance band (ΔV2):
commanding the solenoid to an enabled state to move the pinion gear into engagement with the engine ring gear; and
after a predetermined amount of time since commanding the solenoid to the enabled state, energizing the brushless electric starter motor using power from the ultracapacitor power pack to restart the internal combustion engine.

18. The method of claim 17, further comprising:
monitoring one or more engine operating parameters;
determining when the one or more engine operating parameters meet one or more predefined values indicative of a complete engine start;
ceasing energizing of the brushless electric starter motor when the one or more engine operating parameters meet the predefined values; and
commanding the solenoid to a disabled state to disengage the pinion gear from the engine ring gear when the one or more engine operating parameters meet the one or more predefined values.

19. The method of claim 17, further comprising:
if the updated voltage level (VC) of the ultracapacitor power pack is less than the sum of the minimum voltage level (V2) of the ultracapacitor power pack and the predetermined tolerance band (ΔV2), charging the ultracapacitor power pack to the updated charging voltage (V1) until a voltage level of the ultracapacitor power pack is greater than or equal to a sum of the minimum voltage level (V2) of the ultracapacitor power pack and the predetermined tolerance band (ΔV2) prior to commanding the solenoid to the enabled state and prior to energizing the brushless electric starter motor using power from the ultracapacitor power pack.

* * * * *